US010050490B1

(12) United States Patent
Hubert et al.

(10) Patent No.: US 10,050,490 B1
(45) Date of Patent: Aug. 14, 2018

(54) BEARING WITH ELECTRIC INSULATORS AND THERMAL CONDUCTOR

(71) Applicant: Aktiebolaget SKF, Goteborg (SE)

(72) Inventors: Mathieu Hubert, Ann Arbor, MI (US); Igor Dorrestijn, Woerden (NL); Karl Pries, Traun (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/611,299

(22) Filed: Jun. 1, 2017

(51) Int. Cl.
| *F16C 19/52* | (2006.01) |
| *H02K 5/16* | (2006.01) |
| *F16C 19/06* | (2006.01) |
| *F16C 35/073* | (2006.01) |
| *F16C 35/077* | (2006.01) |
| *F16C 43/04* | (2006.01) |
| *H02K 5/173* | (2006.01) |

(52) U.S. Cl.
CPC ............ *H02K 5/161* (2013.01); *F16C 19/06* (2013.01); *F16C 35/073* (2013.01); *F16C 35/077* (2013.01); *F16C 43/04* (2013.01); *H02K 5/1732* (2013.01); *F16C 2202/32* (2013.01); *F16C 2206/44* (2013.01); *F16C 2206/48* (2013.01); *F16C 2206/60* (2013.01); *F16C 2226/36* (2013.01); *F16C 2380/26* (2013.01)

(58) Field of Classification Search
CPC ...... F16C 19/06; F16C 35/073; F16C 35/077; F16C 43/04; F16C 2206/40; F16C 2206/44; F16C 2206/48; F16C 2206/60; F16C 2208/10; F16C 2208/20; F16C 2380/26; H02K 5/16; H02K 5/161; H02K 5/163; H02K 5/165; H02K 5/1732

USPC .......................................................... 384/476
See application file for complete search history.

(56) References Cited

U.S. PATENT DOCUMENTS

| 2,367,017 | A | * | 1/1945 | Gardiner | ................... | G01L 5/12 |
| | | | | | | 324/207.15 |
| 5,166,565 | A | * | 11/1992 | Katsuzawa | ............. | F16C 25/08 |
| | | | | | | 310/90 |
| 5,735,615 | A | * | 4/1998 | Pontzer | ................... | F16C 35/00 |
| | | | | | | 384/476 |
| 5,961,222 | A | * | 10/1999 | Yabe | ....................... | F16C 19/52 |
| | | | | | | 384/476 |
| 2003/0086630 | A1 | * | 5/2003 | Bramel | ................. | F16C 19/163 |
| | | | | | | 384/476 |
| 2014/0111046 | A1 | * | 4/2014 | Murikipudi | ........... | F16C 35/077 |
| | | | | | | 310/90 |

* cited by examiner

*Primary Examiner* — Phillip A Johnson
(74) *Attorney, Agent, or Firm* — Mark Ussai; SKF USA Inc. Patent Dept.

(57) ABSTRACT

An insulated bearing assembly for coupling a shaft with an outer member includes an inner race disposed upon the shaft and an outer race disposed about the inner race and having an outer circumferential surface and axial ends. An annular insulator is formed of an electrically insulative and thermally conductive material and is coupled with either the outer race or the inner race such that the insulator is generally disposed between the outer race and the outer member or between the inner race and the shaft. A polymeric member has an annular portion(s) disposed against one of the two axial ends of the coupled outer race or inner race and an axial portion(s) extending from the annular portion and coupled with the insulator member so as to retain the insulator member coupled with the outer race or the inner race when the bearing assembly is separate from the outer member.

20 Claims, 19 Drawing Sheets

BEARING WITH ELECTRIC INSULATORS AND THERMAL CONDUCTOR

BACKGROUND OF THE INVENTION

The present invention relates to bearings, and more particularly to bearings for use in electrical equipment such as motors and generators.

Bearing assemblies are well known and typically include inner and outer races and rolling elements between the races, or inner and outer members having relatively slidable surfaces. In either case, damage can occur to the bearing components when electric current passes through the bearing. To prevent such flow of current, bearing races have been provided with insulative coatings or the bearings have been provided with rolling elements formed of a non-conductive material, such as ceramic.

SUMMARY OF THE INVENTION

In one aspect, the present invention is an insulated bearing assembly for coupling a shaft with an outer member, the outer member having an inner surface defining a bore. The bearing assembly comprises an inner race disposed upon the shaft and having an inner circumferential surface and two opposing axial ends and an outer race disposed about the inner race and having an outer circumferential surface and two opposing axial ends. A generally annular insulator is formed of a substantially electrically insulative and thermally conductive material. The insulator has an inner and outer circumferential surfaces and is coupled with the outer race or with the inner race such that the insulator is generally disposed between the outer race and the outer member or between the inner race and the shaft. A polymeric retainer member has at least one generally annular portion disposed against one of the two axial ends of the outer race or of the inner race and at least one axial portion extending from the annular portion and coupled with the at least one insulator member. As such, the polymeric member retains the insulator coupled with the one of the outer race or the inner race when the bearing assembly is separate from the outer member.

In another aspect, the present invention is an insulated bearing assembly for coupling a shaft with an outer member, the housing having an inner surface defining a bore. The bearing assembly comprises an inner race disposeable upon the shaft, an outer race disposed about the inner race and having an outer circumferential surface and opposing axial end surfaces, and a plurality of rolling elements disposed between and rotatably coupling the inner and outer races. A generally annular ceramic insulator has an inner surface disposed against the outer surface of the outer race and an opposing outer surface disposeable against the bore inner surface. Further, a polymeric retainer member has at least one generally annular portion disposed against one axial end of the outer race and at least one axial portion extending from the annular portion and coupled with the at least one insulator member. As such, the polymeric member retains the ceramic insulator coupled with the outer race such that the insulator member inner surface is juxtaposed with the outer race outer surface.

In a further aspect, the present invention is again an insulated bearing assembly for coupling a shaft with an outer member, the shaft having an outer circumferential surface and the outer member having an inner surface defining a bore. The bearing assembly comprises an inner race disposeable upon the shaft and having an inner circumferential surface and two opposing axial ends, an outer race disposed about the inner race and having an outer circumferential surface and two opposing axial ends and a plurality of rolling elements disposed between and rotatably coupling the inner and outer races. A generally annular ceramic insulator has an outer surface disposed against the inner surface of the inner race and an opposing inner surface disposeable about the shaft outer surface. Further, a polymeric retainer member has at least one generally annular portion disposed against one axial end of the inner race and at least one axial portion extending from the annular portion and coupled with the ceramic member. As such, the polymeric member retains the ceramic insulator coupled with the inner race such that the insulator outer surface is juxtaposed with the inner race inner surface.

In yet another aspect, the present invention is a method of fabricating an insulated bearing assembly for coupling a shaft and an outer body. The method comprising the steps of: providing an inner race disposeable upon the shaft, an outer race disposed about the inner race and having an outer circumferential surface and opposing axial end surfaces, a generally annular ceramic insulator having opposing inner and outer surfaces and opposing first and second circumferential ends, and a polymeric member having at least one generally annular portion and at least one axial portion extending from the annular portion; placing the polymeric member on the outer race such that the at least one generally annular end is disposed against one of the outer race axial ends and the at least one axial portion is disposed upon the outer race outer surface; positioning the ceramic insulator about the outer surface such that the insulator inner surface is juxtaposed against the outer race outer surface and the at least one polymeric member axial portion is disposed between a ceramic member first end and a ceramic member second end; and applying heat to the polymeric member such that the at least one annular portion adheres to the outer race axial end and the at least one axial portion adheres to the outer race outer surface and to the ceramic member first and second ends such that the insulator is coupled with the outer race.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
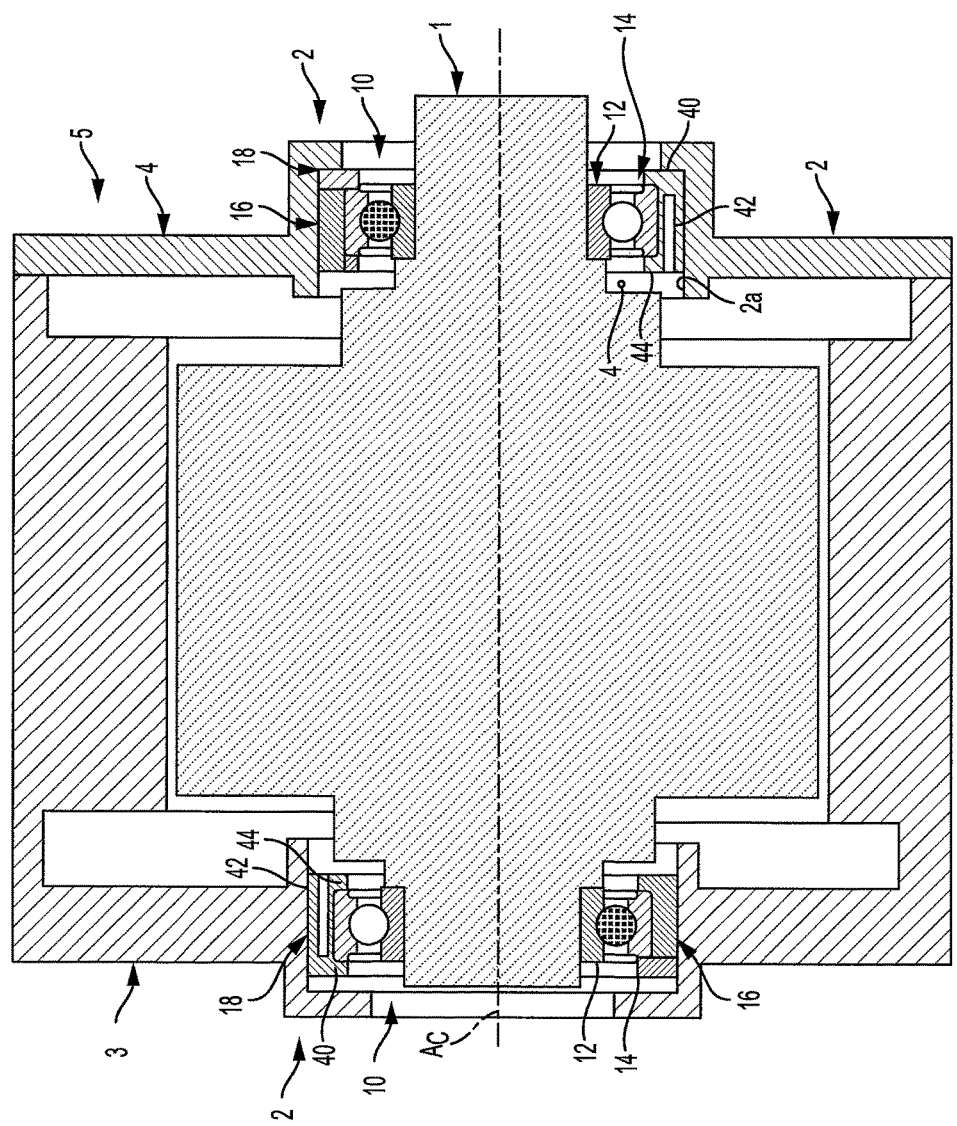
FIG. 1 is an axial cross-sectional view of a machine having two insulated bearing assemblies in accordance with a first construction each having an insulator coupled with a bearing outer race.
Figure 2:
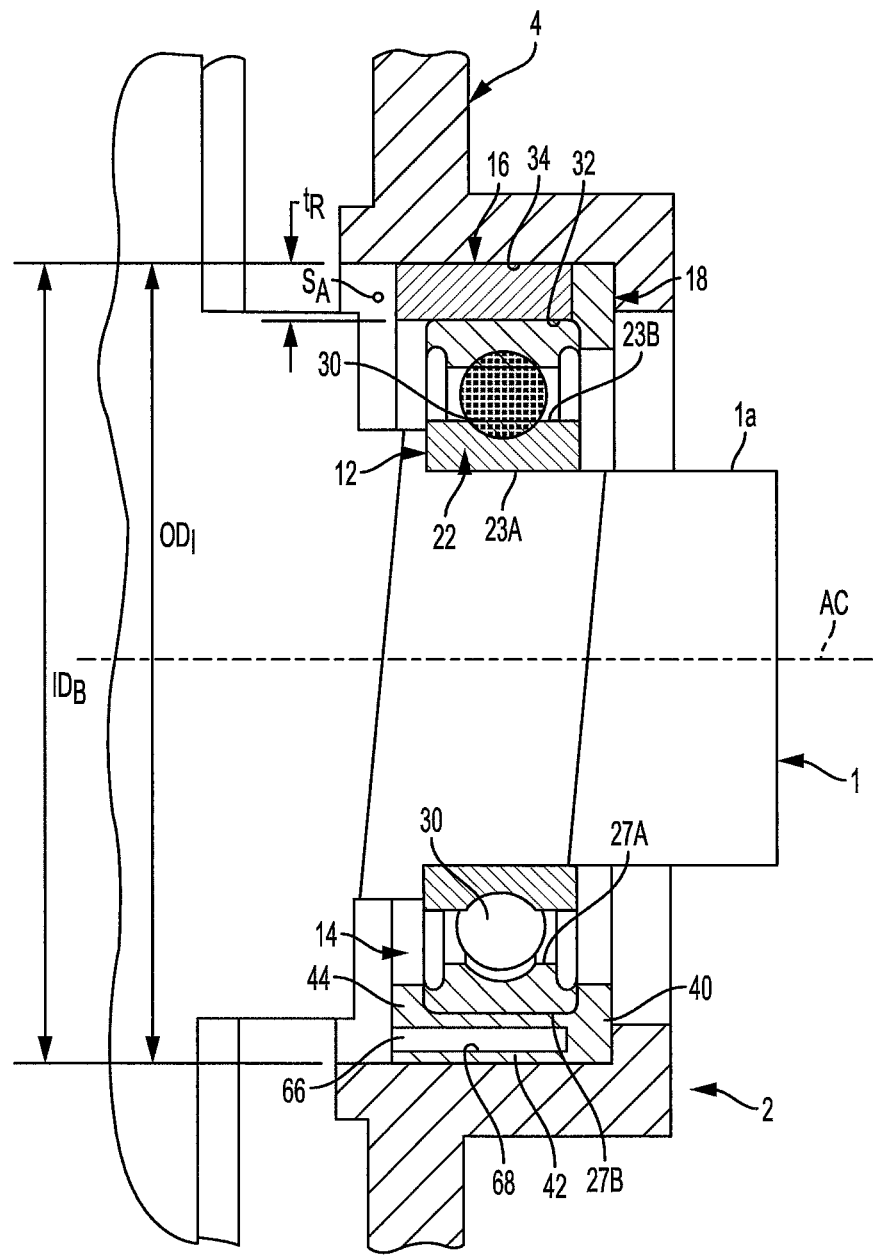
FIG. 2 is an enlarged, broken-away view of a portion of FIG. 1.
Figure 3:
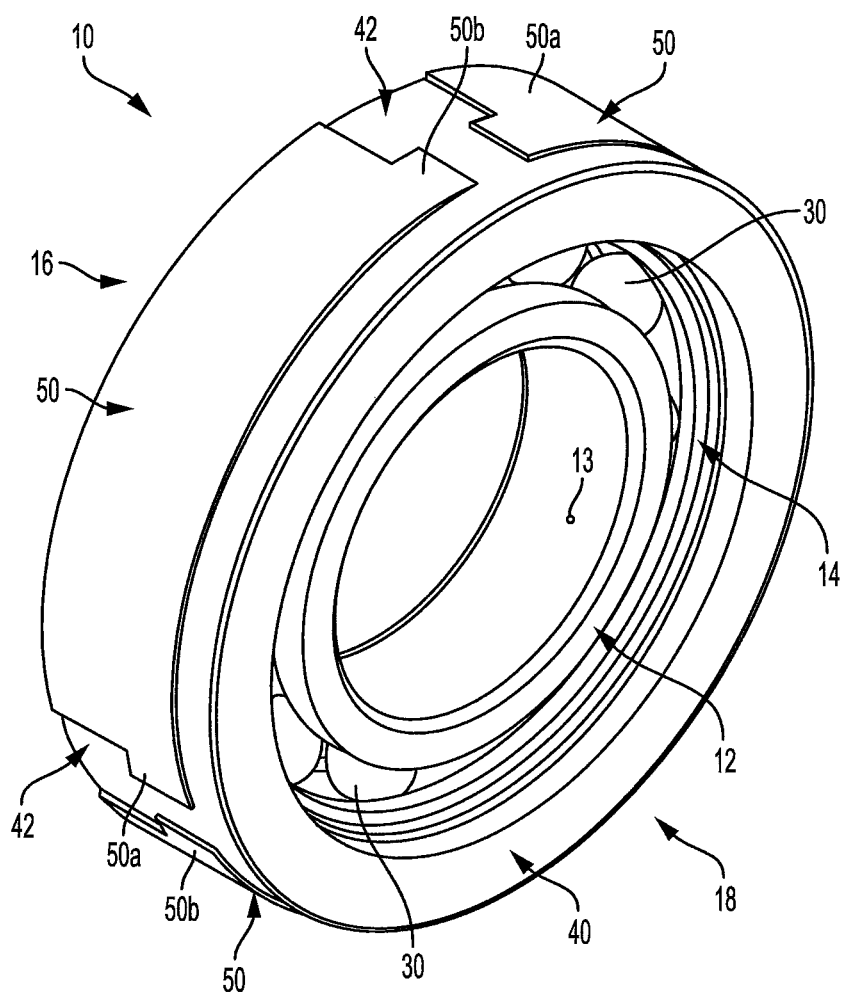
FIG. 3 is a front perspective view of the first construction of the bearing assembly.
Figure 4:
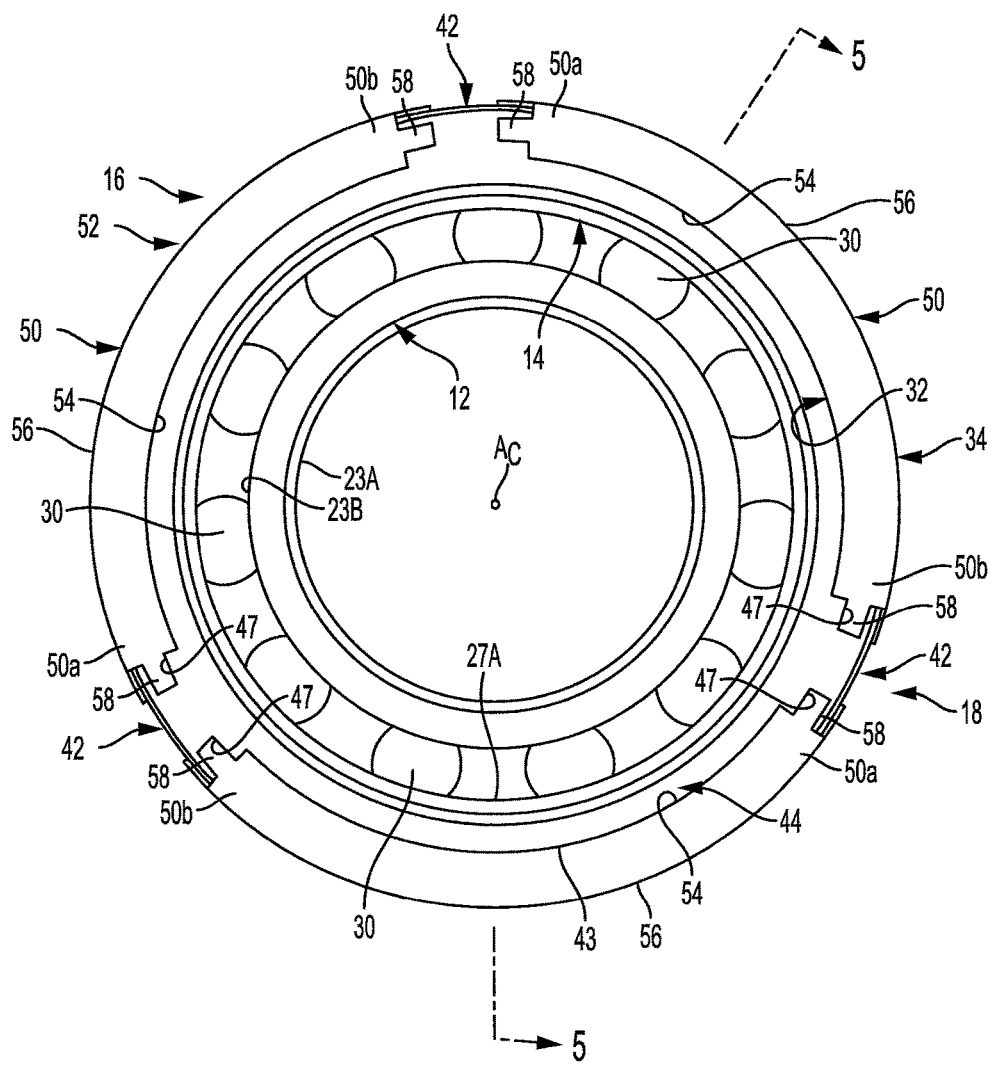
FIG. 4 is a rear plan view of the first construction bearing assembly.

Referring now to the drawings in detail, wherein like numbers are used to indicate like elements throughout, there is shown in FIGS. 1-19 an insulated bearing assembly 10 for rotatably coupling a shaft 1 with an outer member 2 surrounding the shaft 2, for example a housing 3, a cover plate 4, or another portion of a machine 5 such as a motor, a generator or any other device having electrical componentry or operating in an environment of electric potential energy. In any case, either the shaft 1 or the outer member 2 is rotatable about a central axis Ac, the shaft 1 has an outer circumferential surface 1a and an outside diameter ODs (FIG. 13), and the outer member 2 has an inner surface 2a defining a bore 4 with an inside diameter $ID_B$ (FIG. 2). The insulated bearing assembly 10 basically comprises a bearing 11 having an inner race 12 and an outer race 14, a generally annular insulator 16 coupled with and disposed about the outer race 14 (FIGS. 1-12) or within the inner race 12 (FIGS. 13-19), and a polymeric retainer member 18 coupling the insulator 16 with the outer race 14 or with the inner race 12. The inner race 12 is disposeable upon the shaft 1 and preferably includes a generally annular body 22 having an inner circumferential surface 23A defining a bore 13 for receiving the shaft 1, an outer circumferential surface 23B providing an inner raceway surface 25, opposing axial ends 22a, 22b and has an inside diameter $ID_R$. The outer race 14 is disposed about the inner race 12 and preferably includes a generally annular body 26 having an inner circumferential surface 27A providing an outer raceway surface 28, an opposing outer circumferential surface 27B, two opposing axial ends 26a, 26b, and has an outside diameter $OD_R$.

Preferably, the bearing assembly 10 further comprises a plurality of rolling elements 30 rollable simultaneously upon the inner and outer raceway surfaces 24, 28 and rotatably coupling the inner and outer races 12, 14, which may be balls, cylindrical rollers, toroidal rollers, needles, or any other appropriate rolling element. However, the bearing assembly 10 may alternatively be a plain bearing, for example a spherical plane bearing (not shown), formed without rolling elements and with the inner surface 27A of the outer race 14 slidably disposed against the outer surface 23B of the inner race 12.

Referring to FIGS. 1-7 and 9-18, the generally annular insulator 16 is formed of a substantially electrically insulative and thermally conductive material and has opposing inner and outer circumferential surfaces 32, 34, respectively, and opposing circumferential ends 16a, 16b. Preferably, the insulator 16 is formed of a ceramic material, such as for example, zirconium oxide, aluminum oxide, silicon nitride, aluminum titanate, aluminum nitride, etc. However, the insulator member(s) 16 may alternatively be formed of any other material that is both substantially electrically insulative and substantially thermally conductive.

Referring to FIGS. 1-7 and 9-12, in a first construction, the insulator 16 is disposed on the outer race 14 such that the inner surface 32 is disposed against the outer surface 27B of the outer race 14, the opposing outer surface 34 being disposeable against the bore inner surface 2a of the outer member 2 when the bearing assembly 10 is installed. As such, the insulator 16 substantially prevents the flow of electrical current through the bearing assembly 10 while permitting thermal energy (i.e., heat) to conduct from the outer race 14 to the outer member 2. Further, the insulator 16 also functions to transfer radial loading between the bearing 11 and the outer member 2.

Figure 5:
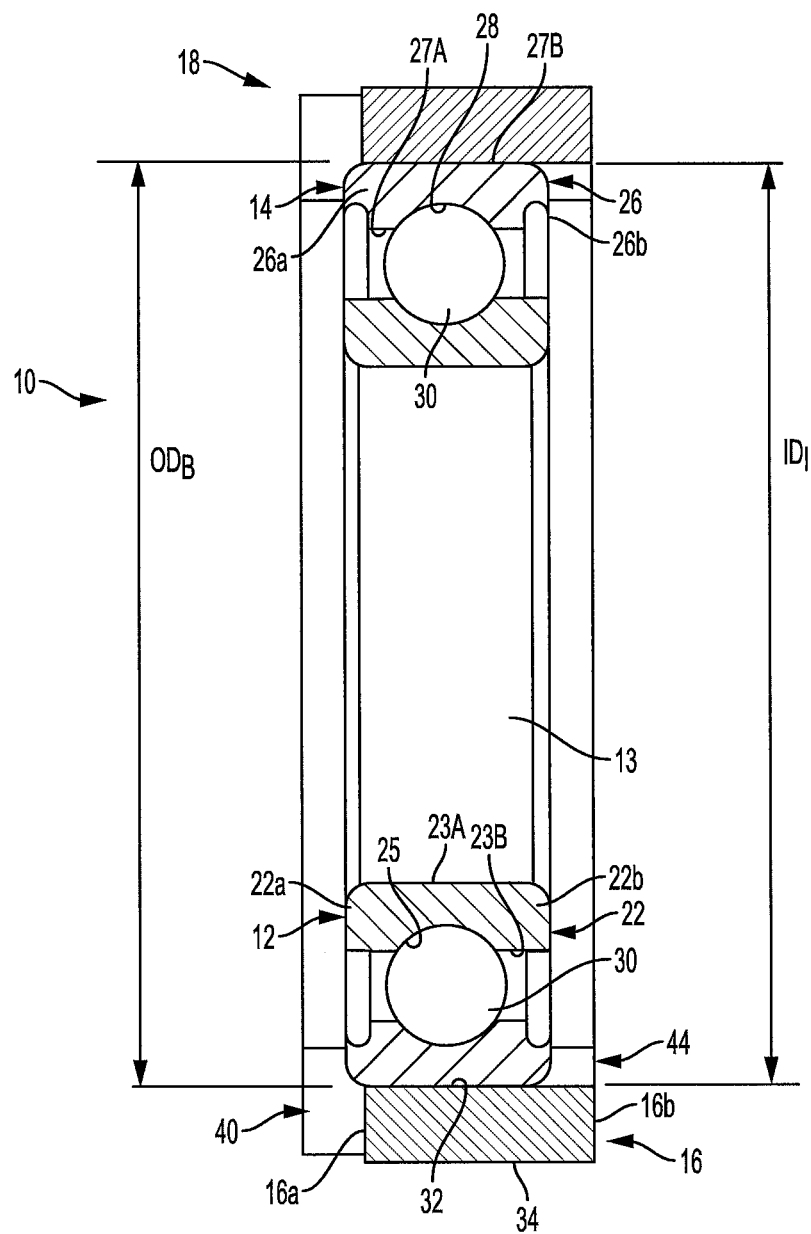
FIG. 5 is an axial cross-sectional view through line 5-5 of FIG. 4.
Figure 6:
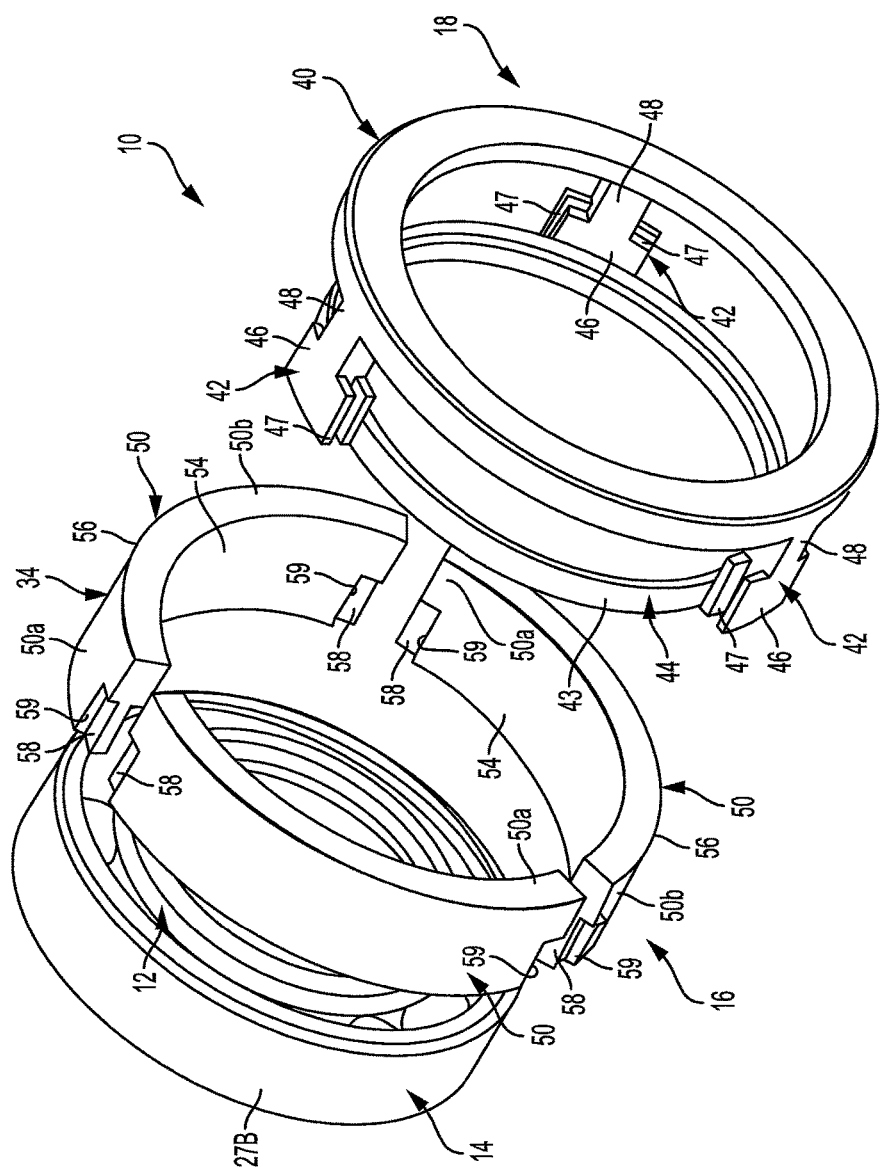
FIG. 6 is an exploded view of the first construction bearing assembly.
Figure 7:
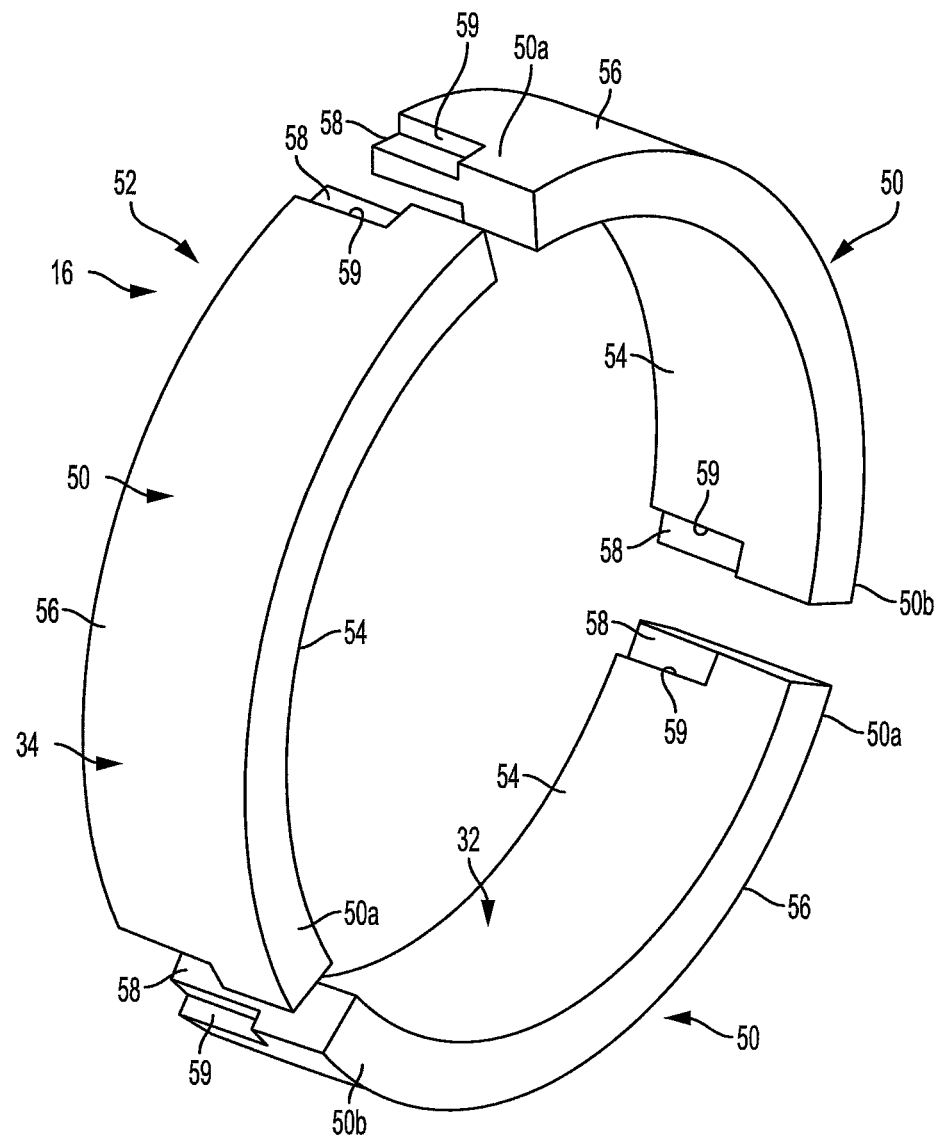
FIG. 7 is a perspective view of an insulator member of the first construction bearing assembly formed of three arcuate segments.
Figure 8:
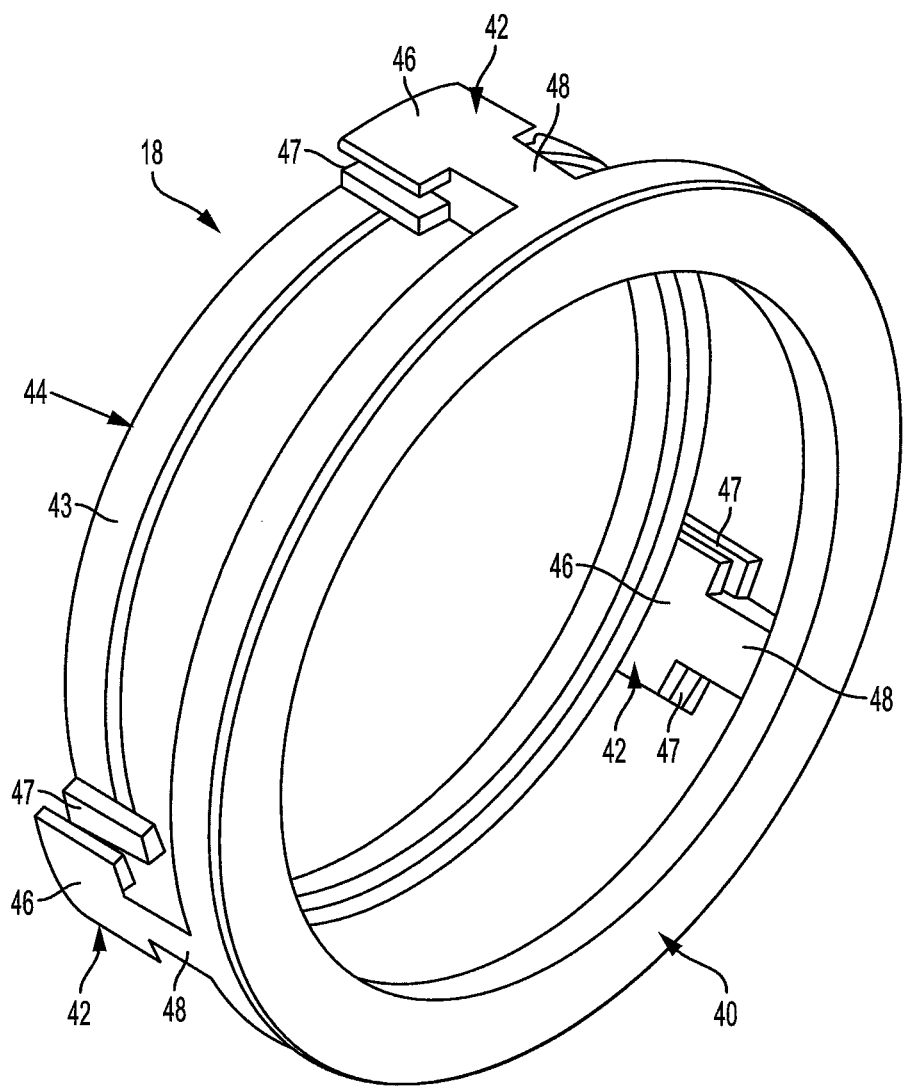
FIG. 8 is a perspective view of a polymeric retainer member of the first construction bearing assembly.
Figure 9:
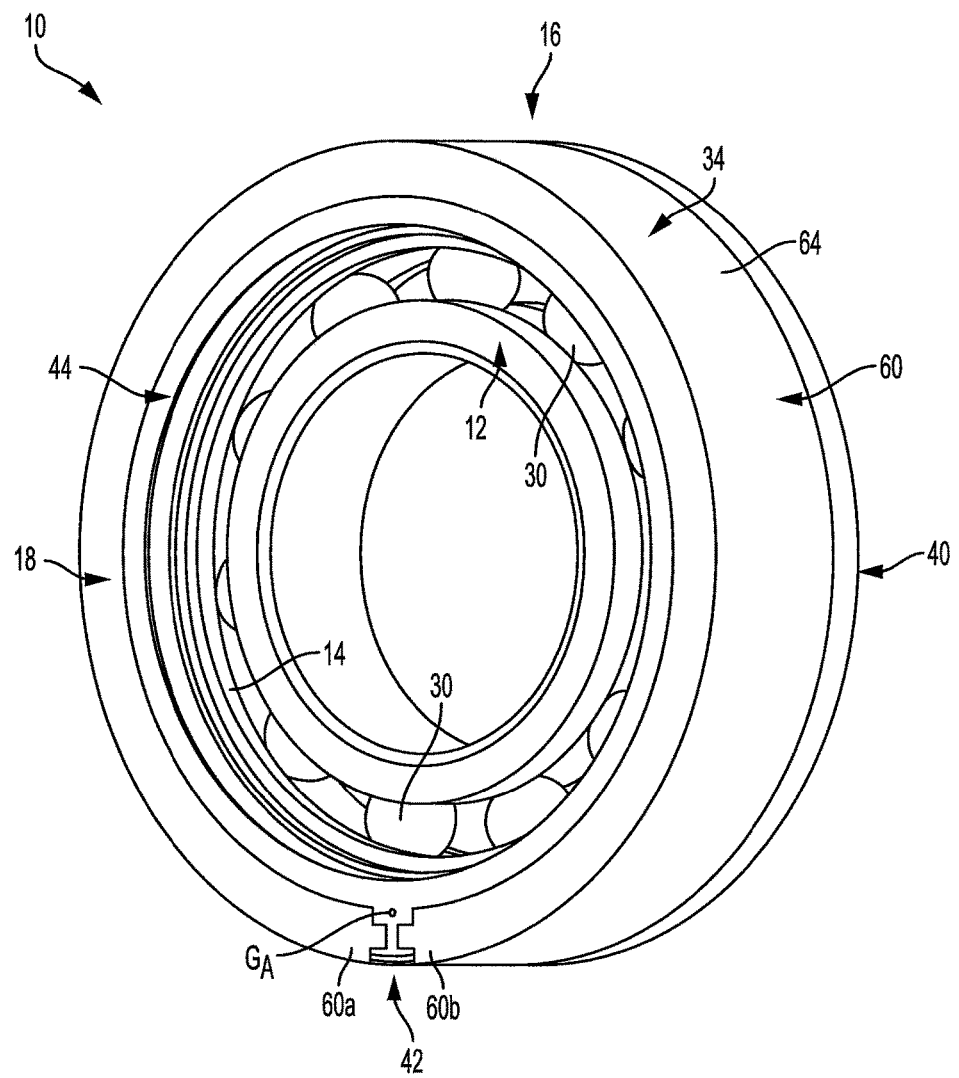
FIG. 9 is rear perspective view of the first construction bearing assembly having an alternative insulator and polymeric retainer structure.
Figure 10:
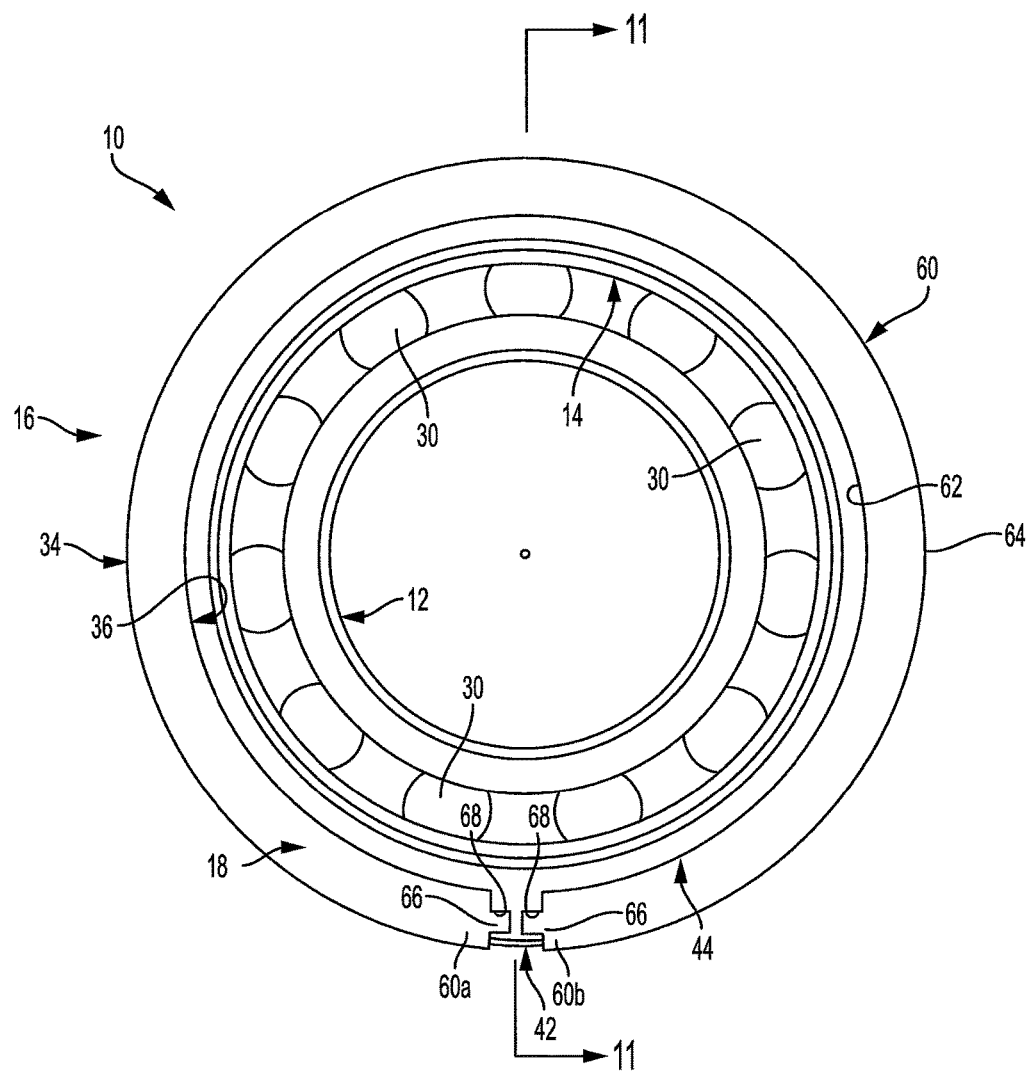
FIG. 10 is a rear plan view of the bearing assembly of FIG. 9.

More specifically, the insulator 16 is formed having an inside diameter $ID_I$ sized about equal to or slightly greater than the outside diameter $OD_B$ of the outer race 14, such that the insulator inner circumferential surface 32 is juxtaposed against the outer race outer surface 27B, as indicated in FIG. 5. Additionally, the insulator 16 is also formed having an outside diameter $OD_I$ sized about equal to or slightly lesser than the bore inside diameter $ID_B$, such that the insulator outer surface 34 is juxtaposed against the bore inner surface 2a, as indicated in FIG. 2. Thereby, a substantially continuous path of thermal conductivity is provided between the bearing inner race 12 and the outer member 2 without any substantial air gap that would inhibit thermal flow from the bearing assembly 10 to the outer member 2 (e.g., housing 3, cover plate 4, etc.). Further, the insulator 16 is preferably fabricated having a radial thickness $t_R$ specifically selected to fit an annular space SA between a standard sized or catalog bearing and a specific size bore 4 in an outer member 2, as indicated in FIG. 2.

Referring now to FIGS. 13-18, in a second construction of the bearing assembly 10, the insulator 16 is disposed within the inner race 12 such that the insulator outer surface 34 is disposed against the inner surface 23A of the inner race 12, the opposing inner surface 23B being disposeable about the shaft outer surface 1a when the bearing assembly 10 is installed. As such, the insulator 16 substantially prevents the flow of electrical current through the bearing assembly 10 while permitting thermal energy (i.e., heat) to conduct from the shaft 1 to the inner race 12, and thereafter through the rolling elements 30, the outer race 14 and the outer member 2. Further, the insulator 16 also functions to transfer radial loading between the bearing 11 and the shaft 1.

Figure 13:
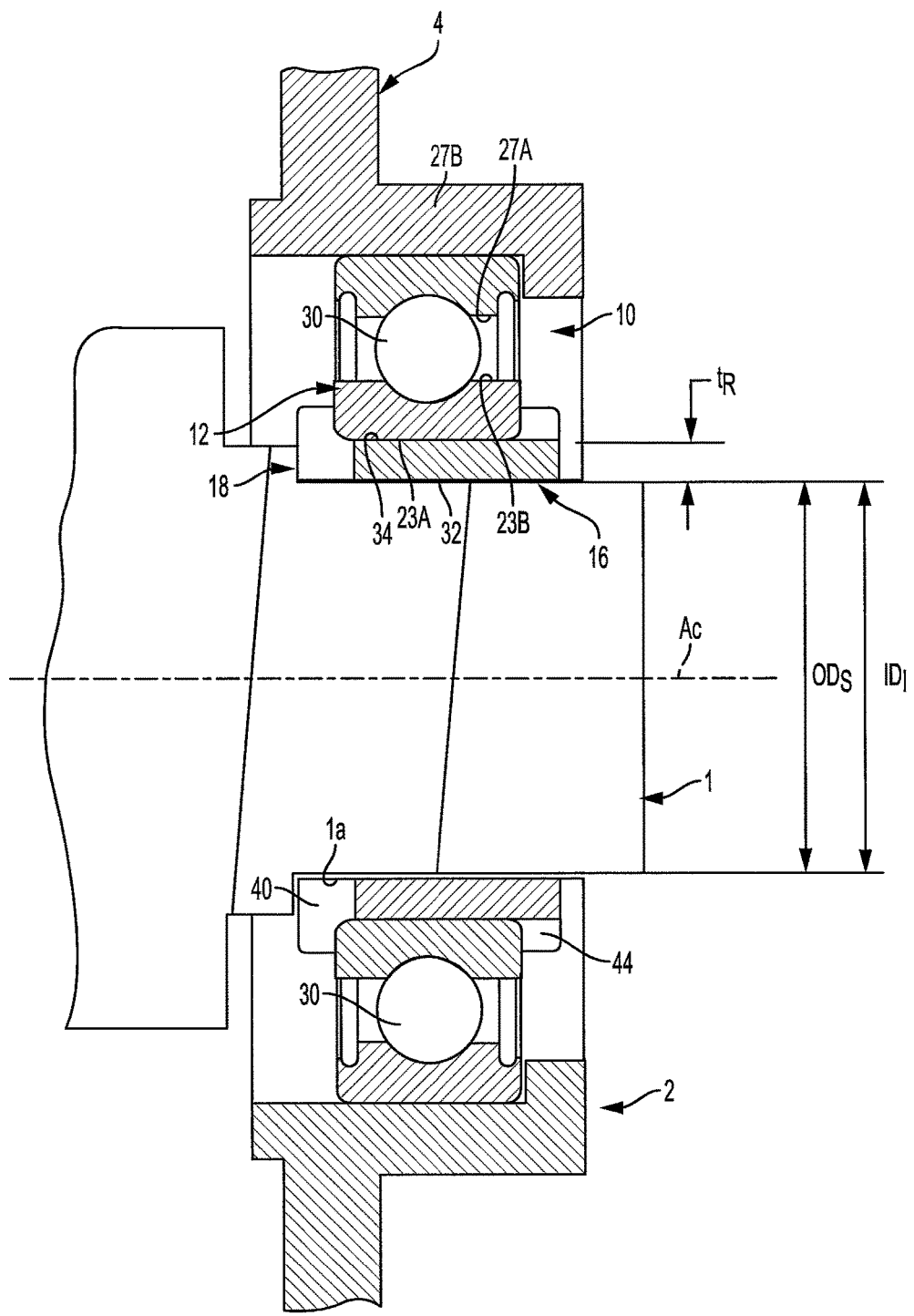
FIG. 13 is an enlarged, broken-away view of a machine having a bearing assembly in accordance with a second construction having an insulator coupled with a bearing inner race.
Figure 14:
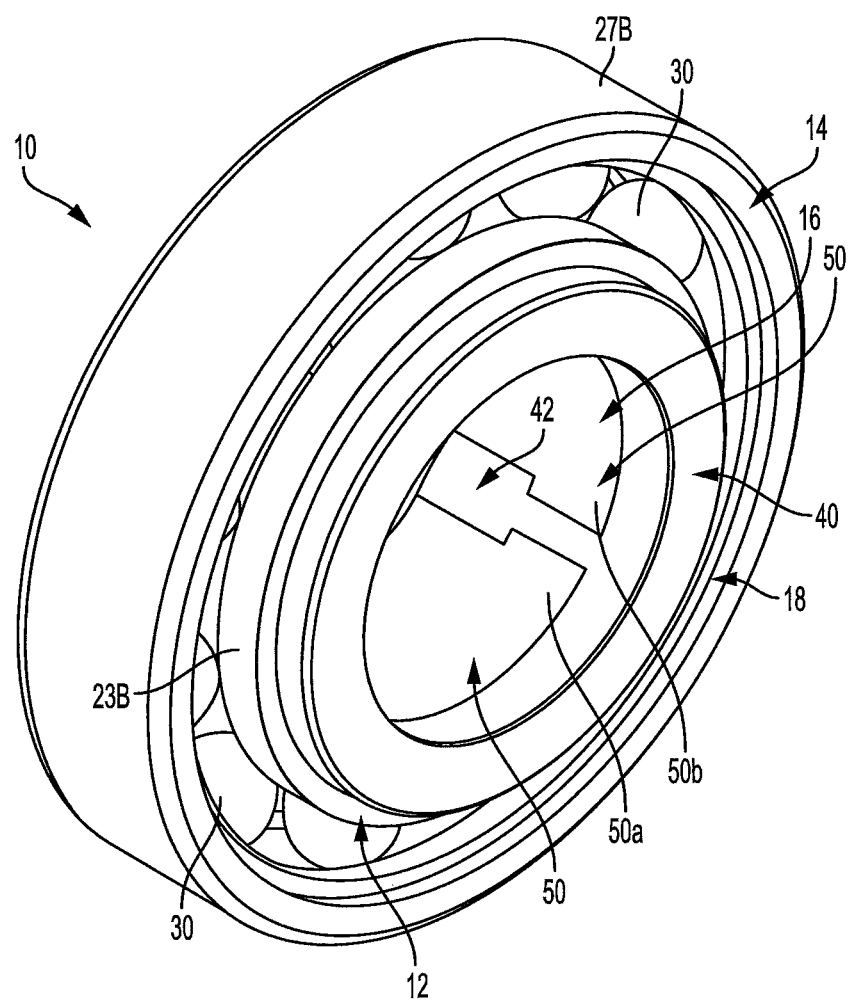
FIG. 14 is a front perspective view of the second construction bearing assembly.
Figure 15:
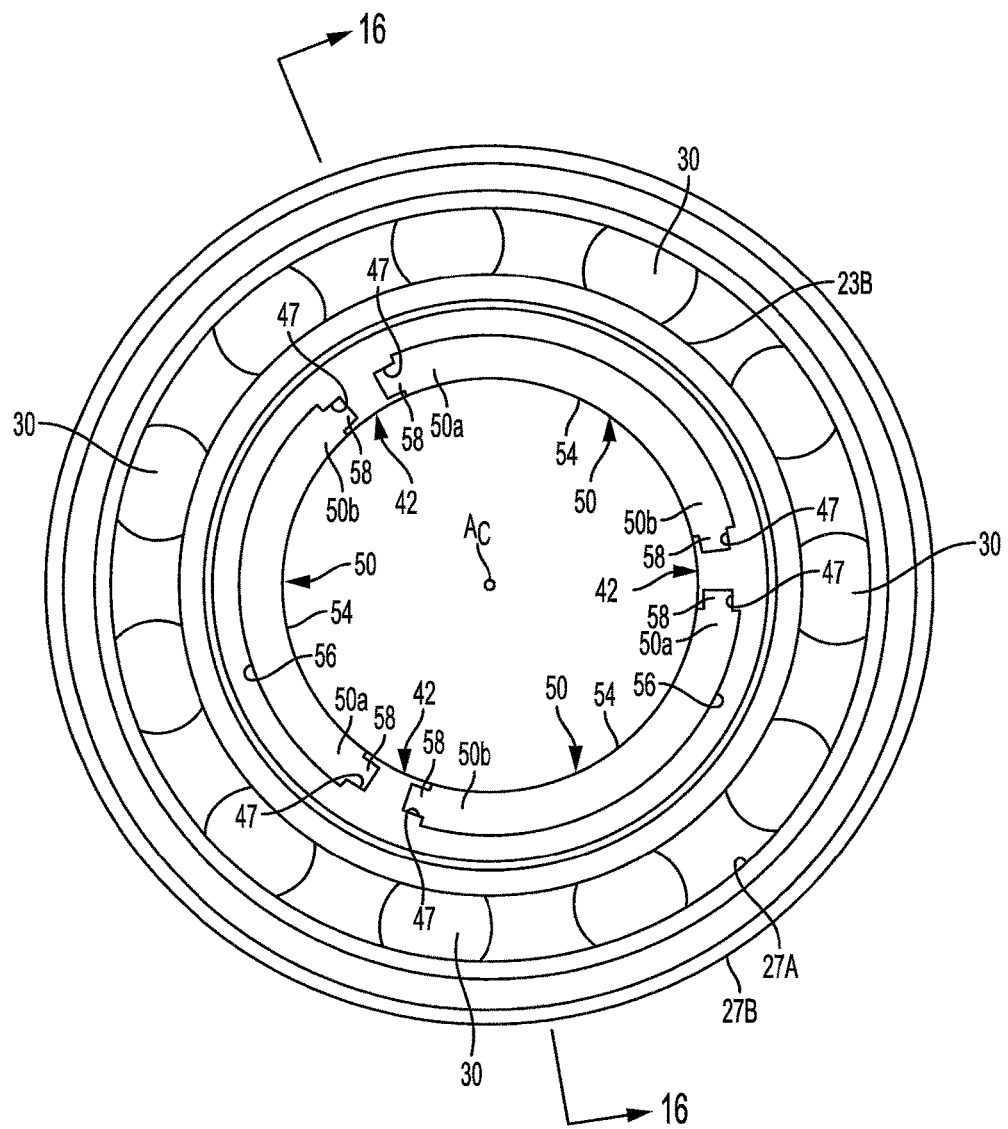
FIG. 15 is a rear plan view of the first construction bearing assembly.
Figure 16:
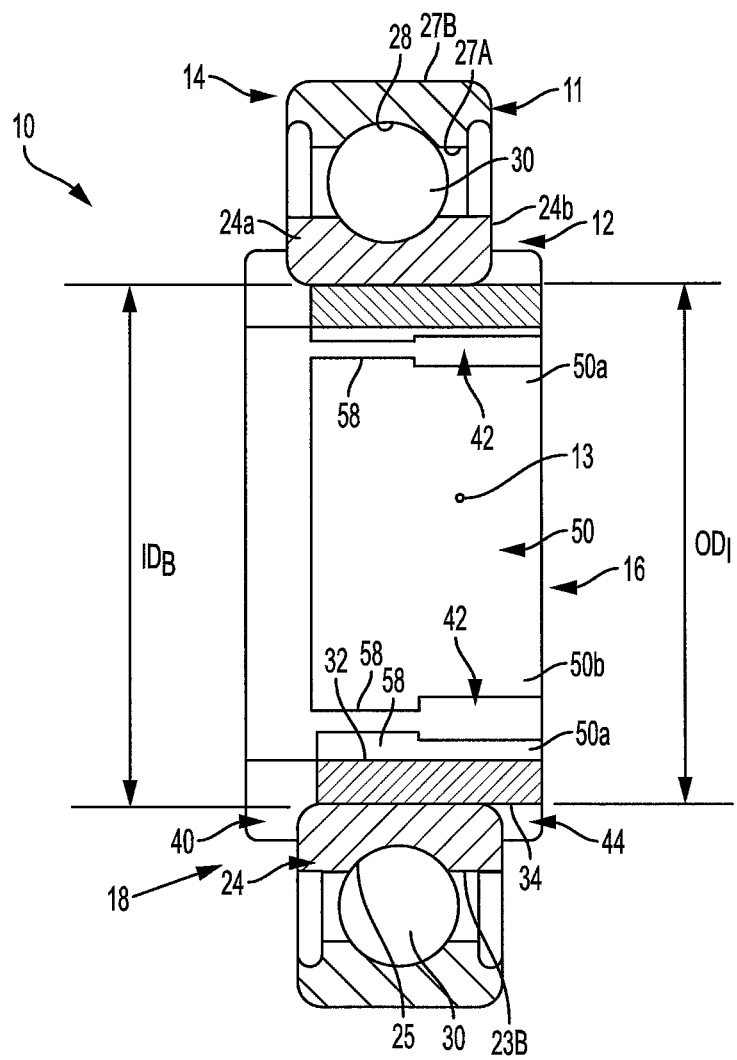
FIG. 16 is an axial cross-sectional view through line 16-16 of FIG. 15.
Figure 17:
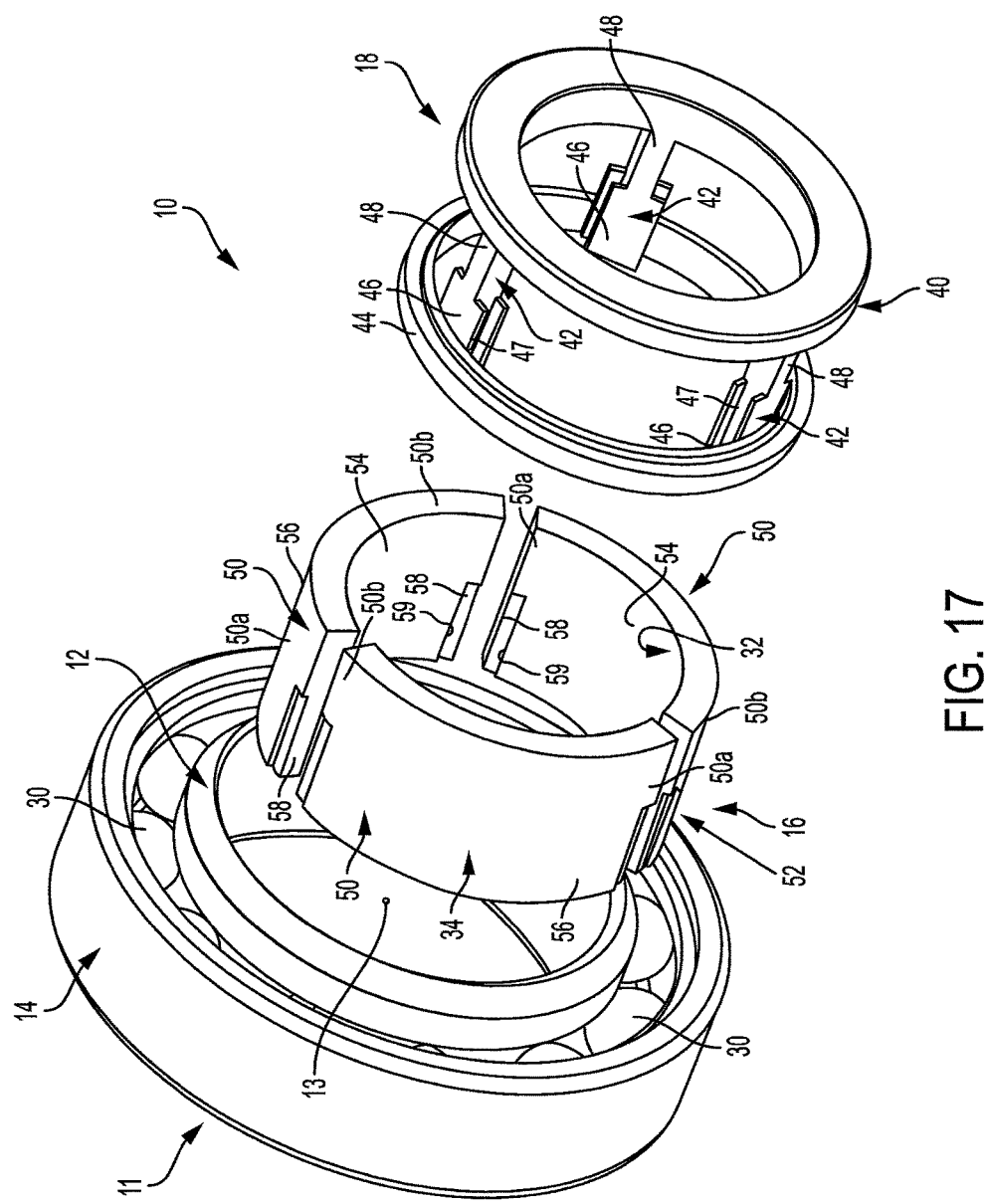
FIG. 17 is an exploded view of the second construction bearing assembly.
Figure 18:
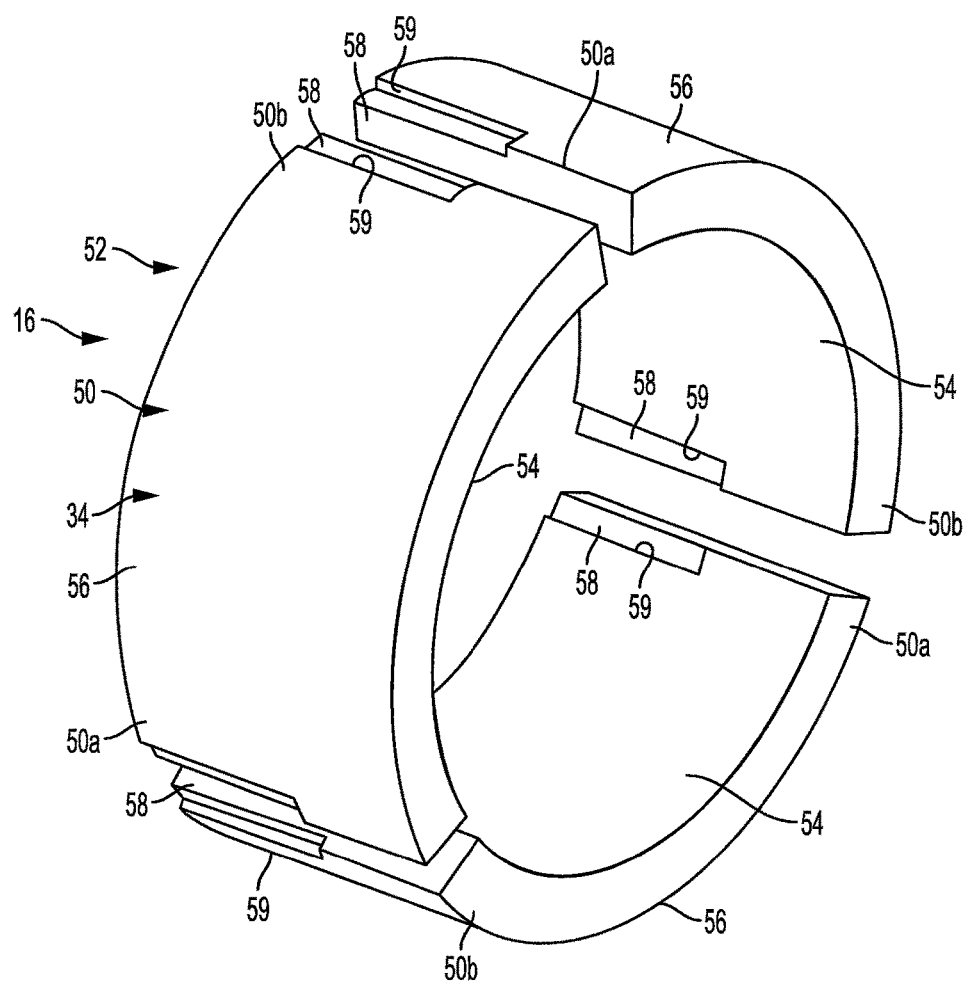
FIG. 18 is a perspective view of an insulator member of the second construction bearing assembly formed of three arcuate segments.
Figure 19:
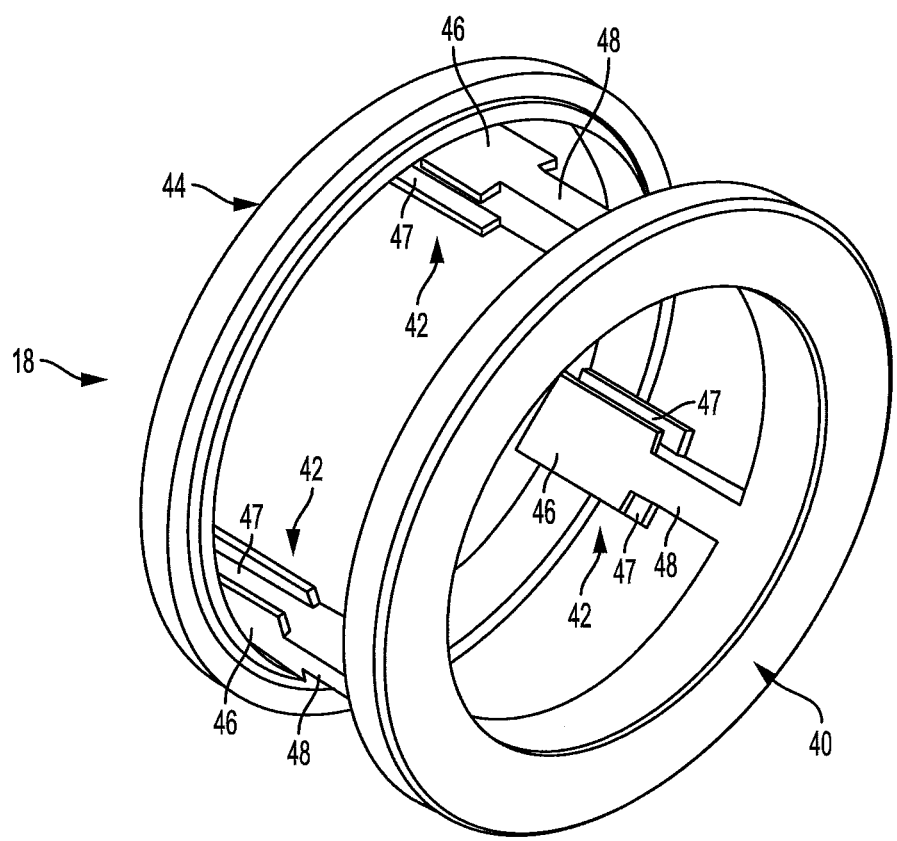
FIG. 19 is a perspective view of a polymeric retainer member of the second construction bearing assembly.

More specifically, the second construction insulator 16 is formed having an outside diameter $OD_I$ sized about equal to or slightly lesser than the inside diameter $ID_B$ of the inner race 12, such that the insulator outer circumferential surface 34 is juxtaposed against the inner race inner surface 23A, as indicated in FIG. 16. Additionally, the insulator 16 is also formed having an inside diameter $Di$ sized about equal to or slightly greater than the shaft outside diameter $ODs$, such that the insulator inner surface 32 is juxtaposed against the shaft outer surface 1a, as indicated in FIG. 13. Thereby, a substantially continuous path of thermal conductivity is provided between the shaft 1 and the bearing inner race 12 without any substantial air gap that would inhibit thermal flow from the bearing assembly 10 to the outer member 2 (e.g., housing 3, cover plate 4, etc.). Further, the second construction insulator 16 is preferably fabricated having a radial thickness $t_R$ specifically selected to fit an annular space $SA_2$ between a standard sized or catalog bearing and a specific size shaft 1, as indicated in FIG. 13.

Referring to FIGS. 1-6, 8-17 and 19, the polymeric retainer member 18 is formed of a substantially electrically and thermally insulative material and includes at least one generally annular portion 40 disposed against one of the two axial ends 26a or 26b of the outer race 14, or one of the ends 24a or 24b of the inner race 12, and at least one axial portion 42 extending from the annular portion 40. The axial portion 42 is coupled with the at least one insulator member 16 so as to retain the insulator member 16 disposed about the outer race 14 or within the inner race 12 when the bearing assembly 10 is separate from the shaft 1 and the outer member 2, i.e., in an uninstalled state. Specifically, the polymeric retainer member 18 is configured to retain the at least one insulator member 16 coupled with the outer race 14 or with the inner race 12, such that the insulator member inner surface 32 is juxtaposed against the outer race outer surface 27B (Figs.) or the insulator member outer surface 34 is juxtaposed against the inner race inner surface 23A, for reasons described above. Also, the polymeric member 18 also substantially prevents relative movement between the insulator 16 and the coupled outer race 14 or coupled inner race 12.

Further, the polymeric member 18 preferably further comprises another generally annular portion 44 disposed against the other axial end 26b or 26a of the bearing outer race 14 or against the other axial end 24b, 24a of the inner race 12. With two annular portions 40, 44, the one or more axial portions 42 extend between and couple the two annular portions 40, 44. By having two annular portions 40, 44, the polymeric member electrically insulates both axial ends 26a, 26b of the outer race 14 or both axial ends 24a, 24b of the inner race 12, thereby preventing any contact between the outer race 14 and the outer member 2, or with a component installed within the outer member 2 (e.g., a seal casing, housing shoulder, etc.), or the inner race 12 and the shaft 1, which could otherwise create a path or circuit through the bearing assembly 10. However, in certain constructions of the bearing assembly 10, it may be preferable to form the polymeric member 18 with only one annular portion 40 or 44 (structure not shown). Further, the polymeric retainer member 18 is preferably formed of a thermoplastic resin (e.g., polyphthalamide), a polyamide 66 (e.g., polyamide 66, Zytel, etc.), a thermoplast, a Duroplast, or a natural or synthetic rubber. However, the polymeric member 18 may be formed of any other polymeric material that is at least substantially electrically insulative, and also preferably thermally insulative.

Preferably, the polymeric member 18 is molded to the outer race 14 or the inner race 12 and the at least one insulator member 16 so as to attach both the polymeric member 18 and the insulator 16 with the outer race 14 or inner race 12, and thereby to the bearing assembly 10. More specifically, the insulator 16 and the polymeric member 18 are preferably first separately formed in an appropriate process, such as shaping and firing the insulator member(s) 16 and injection molding the polymeric member 18. In the first construction, the polymeric member 18 and the insulator 16 are then assembled onto the outer race 14 such that the polymeric member annular portion(s) 40, 44 each abut an axial end 26a or 26b of the outer race body 26, the inner surface 32 of the insulator 16 is disposed against the outer surface 27B of the outer race 14, and each axial portion 42 of the polymeric member 18 couples adjacent circumferential ends of the insulator 16, as described in greater detail below. Alternatively, in the second construction, the polymeric member 18 and the insulator 16 are assembled onto the inner race 12 such that the polymeric member annular portion(s) 40, 44 each abut an axial end 24a or 24b of the inner race body 24, the outer surface 34 of the insulator 16 is disposed against the inner surface 23A of the inner race 12, and each axial portion 42 of the polymeric member 18 couples adjacent circumferential ends of the insulator 16, as described in greater detail below.

Then, heat is applied to the bearing assembly 10 in any appropriate way (e.g., a curing oven) such that, in the first construction bearing assembly 10, the polymeric member annular portion(s) 40 and/or 44 adhere or bond to the axial end(s) 26a or 26b of the outer race 14, and the polymeric member axial portions bond/adhere to the outer race outer surface 27B and to the ends 16a, 16b of one insulator member 16 or of two separate, adjacent members 16, as discussed below. Alternatively with the second construction bearing assembly 10, the applied heat causes the polymeric member annular portion(s) 40 and/or 44 adhere or bond to the axial end(s) 24a or 24b of the inner race 12, and the polymeric member axial portions bond/adhere to the inner race inner surface 23A and to the ends 16a, 16b of one insulator member 16 or of two separate, adjacent members 16, as also discussed below. In either construction, the polymeric member 18 retains the insulator 16 coupled with the outer race 14 or the inner race 12, which is particularly beneficial when the bearing assembly 10 is in an uninstalled state, such as for example, during inventory storage or in shipment to a customer. However, the insulator 16 may alternatively be adhered or bonded to the outer race 14 by any other appropriate means, such as by means of a separate bonding agent or adhesive and/or the polymeric retainer member 18 may alternatively be attached to the insulator 16 and/or the coupled bearing race 14 or 21 by any other appropriate means, such as by an adhesive or bonding agent, by means of one or more tabs or shoulders provided in the polymeric member 18 and retained within a groove in the race 14, 12, etc.

Referring now to FIGS. 3-8 and 13-18, in one preferred insulator construction, the insulator 16 includes a plurality of arcuate segments 50 collectively forming a generally circular ring 52. Each arcuate segment 50 has opposing inner and outer circumferential surface sections 54, 56 and opposing first and second circumferential ends 50a, 50b. The plurality of segments 50 are arranged about the outer race 14 or within the inner race 12 such that each segment first end 50a is at least generally proximal to the second end 50b of an adjacent segment 50. When so arranged, the segment inner surface sections 54 collectively form the insulator inner surface 32 and the outer surface sections 56 collectively form the insulator outer surface 34. As best shown in FIGS. 6, 7 17 and 18, each segment end 50a and 50b is preferably formed with a partial tab portion 58 defined between two recesses or pockets 59 extending circumferentially inwardly from the end 50a or 50b, the tab 58 being received in an axial portion 42 of the polymeric member 18 as described below.

With such an insulator structure, the polymeric member 18 includes at least two axial portions 42 and more particularly, a number of axial portions 42 equal to the number of arcuate segments 50, e.g. three axial portions 42 when there are three segments 50, etc. Each polymeric member axial portion 42 is attached to and couples the first circumferential end 50a of one of the segments 50 with the second circumferential end 52b of an adjacent one of the segments 50. Preferably, each polymeric member axial portion 42 is generally T-shaped and has an enlarged section 46 with two pockets 47 extending inwardly from opposing circumferential sides and a reduced section 48 extending axially between the enlarged section 46 and the first annular portion 40. Further, such a polymeric retainer member 18 preferably includes the second annular portion 44, with the enlarged section 46 of each axial portion 42 being attached to an outer surface 43 of the second annular portion 42. Preferably, the first annular portion 40 has a radial thickness that is greater than the radial thickness (neither indicated) of the second annular portion 44, for reasons discussed below.

With such a polymeric member structure and the first bearing assembly construction, the polymeric retainer member 18 is preferably first installed on the outer race 14 by inserting the bearing 11 into a central bore 45 of the second annular portion 44, such that the relatively thinner annular portion 44 "stretches" about the outer race 14, until the outer race axial end 26a is disposed against the polymeric member first annular portion 40. Then, each arcuate segment 50 is inserted between a separate pair of each two adjacent axial portions 42 such that the recessed tab portion 58 at each segment end 50a or 50b is received within one pocket 47 of the adjacent axial portions 42. At this point, the polymeric member 18 retains the insulator arcuate segments 50 disposed against the outer race 14 until heat is applied to mold or bond the polymeric member 18 to the segments 50 and the outer race 14.

Alternatively, with the above-described polymeric member structure and the second construction bearing assembly 10, the polymeric retainer member 18 is preferably first installed on the inner race 12 by inserting the polymeric member 18 within the inner race bore 13, such that the relatively flexible annular portion 44 "collapses" and is pushed through the inner race 12, until the polymeric member first annular portion 40 is disposed against the inner race axial end 24a. Then, each arcuate segment 50 is inserted between a separate pair of each two adjacent axial portions 42 such that the recessed tab portion 58 at each segment end 50a or 50b is received within one pocket 47 of the adjacent axial portions 42. At this point, the polymeric member 18 retains the insulator arcuate segments 50 disposed within the inner race 12 until heat is applied to mold or bond the polymeric member 18 to the segments 50 and the inner race 12.

Although the structure of the insulator member segments 50 and the polymeric member 18 as described above and depicted in FIGS. 3-8 and 13-18 is presently preferred, the arcuate segments 50 and/or the polymeric member axial portions 42 may be formed without tabs and pockets and/or may have any other appropriate structure for at least temporarily retaining the segments 50 on the outer race 14 until molding of the polymeric member 18.

Figure 11:
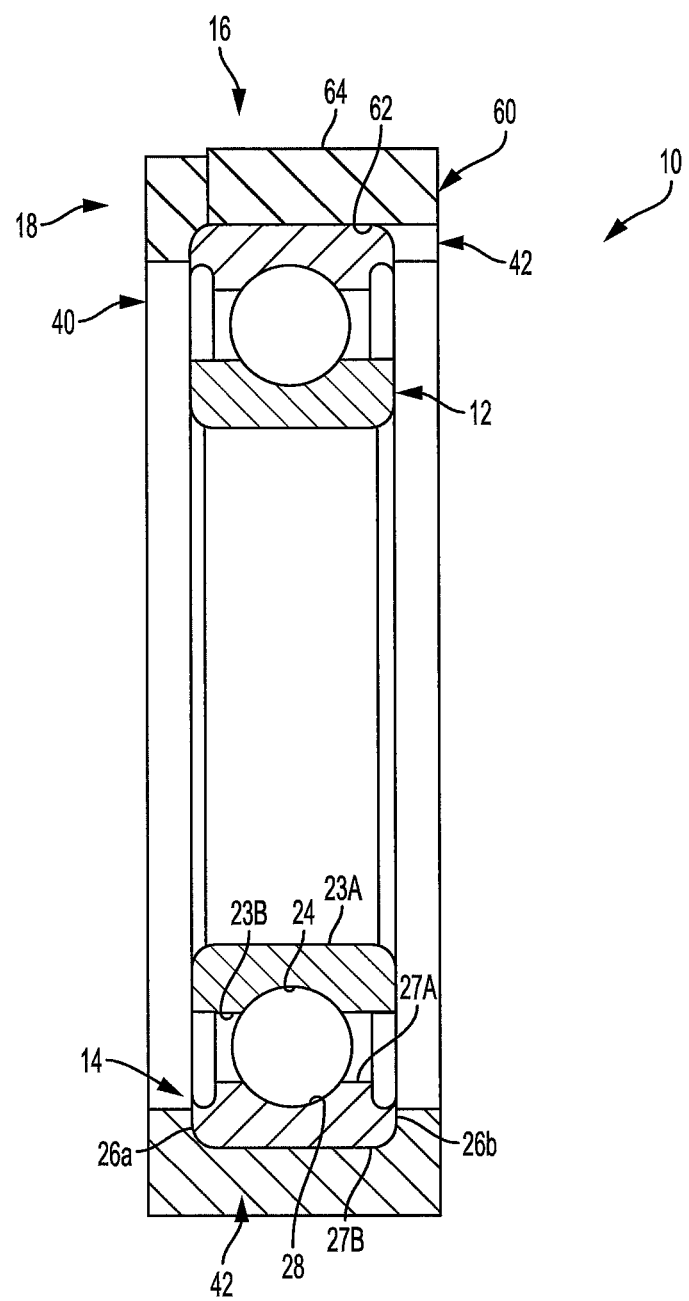
FIG. 11 is an axial cross-sectional view through line 11-11 of FIG. 10.
Figure 12:
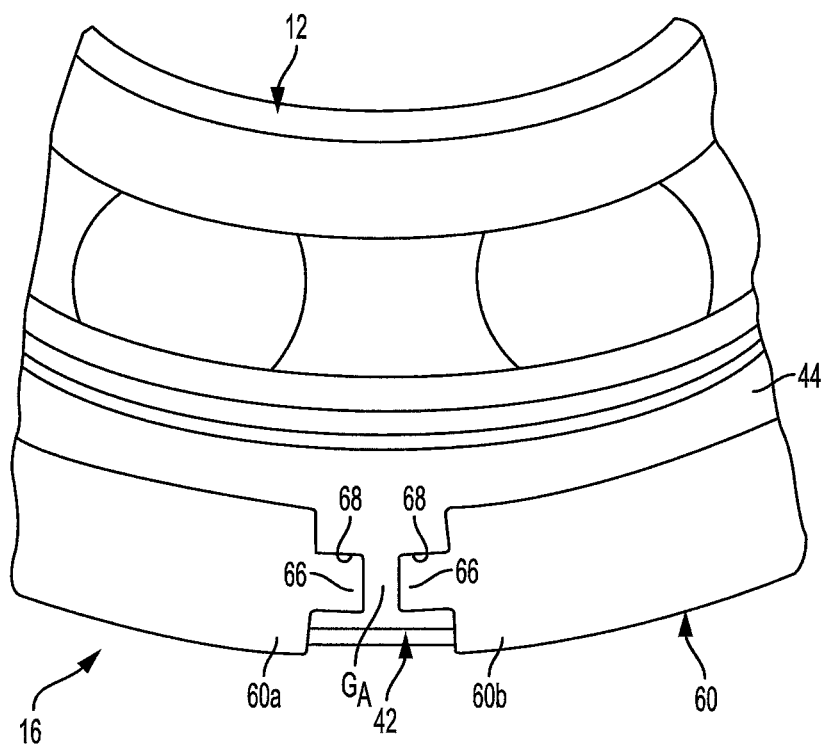
FIG. 12 is an enlarged, broken-away view of a portion of FIG. 10.

Referring to FIGS. 1, 2 and 9-12, in another preferred construction, the at least one insulator member 16 includes a single, generally circular ring 60 having opposing inner and outer circumferential surfaces 62, 64 providing insulator surfaces 32, 34, respectively, opposing axial ends 60a, 60b, and two generally adjacent circumferential ends 60a, 60b defining an axial gap GA. With such a single insulator member 16, the polymeric retainer member 18 preferably includes a single axial portion 42 disposed within the gap GA and coupling the ring circumferential ends 60a, 60b, the axial portion 42 extending between and being connected with both annular portions 40, 44. Preferably, each ring end 60a, 60b preferably has an extended tab 66 and the polymeric member axial portion 42 has a pair of opposing slots 68 each receiving a separate one of the ring tabs 66, as best shown in FIGS. 2 and 11. Although only described and depicted with the first bearing assembly construction having an insulator 16 coupled with the outer race 14, the bearing assembly 10 may also include a single insulator member 16 formed as a ring and disposed within the inner race 12, with the polymeric retainer member 18 constructed generally similarly as described above, but sized to fit onto the inner race 12.

Similarly with the other preferred structure, the polymeric member 18 is preferably first installed on the bearing outer race 14 so that the annular portion 40 is disposed against one axial end 26a, the other annular portion 44 is disposed against the other axial end 26b, and the axial portion 42 is disposed upon the outer race outer surface 27B. Then, the insulator member ring 60 is slided over the outer race outer surface 27B from the second axial end 26b, such that the ring tabs 66 enter the axial portion slots 68, until one axial end 63a of the ring 60 abuts against the polymeric member annular portion 40. The polymeric member 18 retains the insulator member ring 60 coupled with the outer race 14 until heat is applied to mold the polymeric member 18 to the outer race 14 and the insulator ring 60.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. An insulated bearing assembly for coupling a shaft with an outer member, the shaft having an outer surface and the outer member having an inner surface defining a bore, the bearing assembly comprising:
   an inner race disposed upon the shaft and having an inner circumferential surface and two opposing axial ends;
   an outer race disposed about the inner race and having an outer circumferential surface and two opposing axial ends;

a generally annular insulator formed of a substantially electrically insulative and thermally conductive material, the insulator having inner and outer circumferential surfaces and being coupled with one of the outer race and the inner race such that the insulator is generally disposed between the outer race and the outer member or between the inner race and the shaft; and a polymeric retainer member having at least one generally annular portion disposed against one of the two axial ends of the one of the outer race and the inner race and at least one axial portion extending from the annular portion and coupled with the insulator so as to retain the insulator coupled with the one of the outer race and the inner race when the bearing assembly is separate from the outer member and the shaft.

2. The bearing assembly as recited in claim 1 wherein one of:

the insulator inner surface is disposed against the outer surface of the outer race and the insulator outer surface is disposeable against the bore inner surface; and the insulator outer surface is disposed against the inner surface of the inner race and the insulator inner surface is disposeable against the shaft outer surface.

3. The bearing assembly as recited in claim 2 wherein one of the polymeric member retains the insulator coupled with the outer race such that the insulator inner surface is juxtaposed against the outer race outer surface; and the polymeric member retains the insulator coupled with the inner race such that the insulator outer surface is juxtaposed against the inner race inner surface.

4. The bearing assembly as recited in claim 1 wherein the bearing outer race has an outside diameter and the insulator is formed having an inside diameter sized such that the insulator inner circumferential surface is juxtaposed against the outer race outer surface and an outside diameter sized such that the insulator outer circumferential surface is juxtaposeable against the bore inner surface.

5. The bearing assembly as recited in claim 1 wherein the bearing inner race has an inside diameter and the insulator is formed having an outside diameter sized such that an insulator outer circumferential surface is juxtaposed against the inner race inner surface and an outside diameter sized such that the insulator inner circumferential surface is juxtaposeable against the shaft outer surface.

6. The bearing assembly as recited in claim 1 wherein:

the insulator includes a plurality of arcuate segments collectively forming a generally circular ring, each segment having opposing first and second circumferential ends, the segments being arranged such that each segment first end is at least generally proximal to the second end of an adjacent segment; and the at least one axial portion of the polymeric member includes at least two axial portions, each axial portion being attached to and coupling the first circumferential end of one of the segments with the second circumferential end of an adjacent one of the segments.

7. The bearing assembly as recited in claim 1 wherein the insulator includes a generally circular ring having two adjacent circumferential ends defining an axial gap, the at least one axial portion of the polymeric member being disposed within the gap and coupling the ring circumferential ends.

8. The bearing assembly as recited in claim 1 wherein the polymeric member further comprises another generally annular portion disposed against the other axial end of the one of the outer race and the inner race, the at least one axial portion extending between and coupling the two annular portions.

9. The bearing assembly as recited in claim 1 wherein the insulator material is one of zirconium oxide, aluminum oxide, silicon nitride, aluminum titanate, and aluminum nitride.

10. An insulated bearing assembly for coupling a shaft with an outer member, the housing having an inner surface defining a bore, the bearing assembly comprising:

an inner race disposeable upon the shaft and having an inner circumferential surface and two opposing axial ends;

an outer race disposed about the inner race and having an outer circumferential surface and two opposing axial ends;

a plurality of rolling elements disposed between and rotatably coupling the inner and outer races;

a generally annular ceramic insulator having an inner surface disposed against the outer surface of the outer race and an opposing outer surface disposed against the bore inner surface; and a polymeric retainer member having at least one generally annular portion disposed against one axial end of the outer race and at least one axial portion extending from the annular portion and coupled with the ceramic insulator so as to retain the ceramic insulator coupled with the outer race such that the insulator member inner surface is juxtaposed with the outer race outer surface.

11. The bearing assembly as recited in claim 10 wherein the polymeric member is formed of a substantially electrically and thermally insulative material.

12. The bearing assembly as recited in claim 11 wherein:

the ceramic insulator includes a plurality of arcuate segments collectively forming a generally circular ring, each segment having opposing first and second circumferential ends, the segments being arranged about the outer race such that each segment first end is at least generally proximal to the second end of an adjacent segment; and the at least one axial portion of the polymeric member includes at least two axial portions, each axial portion being attached to and coupling the first circumferential end of one of the insulator segments with the second end of an adjacent one of the insulator segments.

13. The bearing assembly as recited in claim 11 wherein the ceramic insulator includes a generally circular ring having two adjacent circumferential ends defining an axial gap, the at least one axial portion of the polymeric member being disposed within the gap and coupling the ring circumferential ends.

14. The bearing assembly as recited in claim 11 wherein the polymeric retainer member further comprises another generally annular portion disposed against the other axial end surface of the bearing outer race, the at least one axial portion extending between and coupling the two annular portions.

15. An insulated bearing assembly for coupling a shaft with an outer member, the shaft having an outer circumferential surface and the outer member having an inner surface defining a bore, the bearing assembly comprising:

an inner race disposeable upon the shaft and having an inner circumferential surface and two opposing axial ends;

an outer race disposed about the inner race and having an outer circumferential surface and two opposing axial ends;

a plurality of rolling elements disposed between and rotatably coupling the inner and outer races;

a generally annular ceramic insulator having an outer surface disposed against the inner surface of the inner race and an opposing inner surface disposeable about the shaft outer surface; and a polymeric retainer member having at least one generally annular portion disposed against one axial end of the inner race and at least one axial portion extending from the annular portion and coupled with the ceramic insulator so as to retain the ceramic insulator coupled with the inner race such that the insulator outer surface is juxtaposed with the inner race inner surface.

16. The bearing assembly as recited in claim 15 wherein:

the ceramic insulator includes a plurality of arcuate segments collectively forming a generally circular ring, each segment having opposing first and second circumferential ends, the segments being arranged about the outer race such that each segment first end is at least generally proximal to the second end of an adjacent segment; and the at least one axial portion of the polymeric member includes at least two axial portions, each axial portion being attached to and coupling the first circumferential end of one of the insulator segments with the second end of an adjacent one of the insulator segments.

17. The bearing assembly as recited in claim 15 wherein the ceramic insulator includes a generally circular ring having two adjacent circumferential ends defining an axial gap, the at least one axial portion of the polymeric member being disposed within the gap and coupling the ring circumferential ends.

18. The bearing assembly as recited in claim 15 wherein the polymeric retainer member further comprises another generally annular portion disposed against the other axial end surface of the bearing inner race, the at least one axial portion extending between and coupling the two annular portions.

19. A method of fabricating an insulated bearing assembly for coupling a shaft and an outer body, the method comprising the steps of:

providing an inner race disposeable upon the shaft, an outer race disposed about the inner race and having an outer circumferential surface and opposing axial end surfaces, a plurality of rolling elements disposed between and rotatably coupling the inner and outer races, a generally annular ceramic insulator having opposing inner and outer surfaces and opposing first and second circumferential ends, and a polymeric member having at least one generally annular portion and at least one axial portion extending from the annular portion;

placing the polymeric member on the outer race such that the at least one generally annular end is disposed against one of the outer race axial ends and the at least one axial portion is disposed upon the outer race outer surface;

positioning the ceramic insulator about the outer surface such that the ceramic insulator inner surface is juxtaposed against the outer race outer surface and the polymeric member axial portion is disposed between the insulator first end and the insulator second end; and applying heat to the polymeric member such that the at least one annular portion adheres to the outer race axial end and the at least one axial portion adheres to the outer race outer surface and to the insulator first and second ends such that the insulator is coupled with the outer race.

20. The method as recited in claim 19 further comprising the step of sizing the radial thickness of the ceramic insulator to be substantially equal to a radial dimension of an annular clearance spaced between the outer race and a housing bore.

* * * * *